United States Patent
Wagner

[11] Patent Number: 5,809,988
[45] Date of Patent: Sep. 22, 1998

[54] ADJUSTABLE COOKING GRILL

[76] Inventor: Larry C. Wagner, Rte. 3, Manor Rd., Steele, Mo. 63877

[21] Appl. No.: 822,035

[22] Filed: Mar. 24, 1997

[51] Int. Cl.[6] ....................................................... F24B 3/00
[52] U.S. Cl. ....................................... 126/25 A; 126/25 R
[58] Field of Search ..................................... 126/25 A, 25, 126/41 R

[56] References Cited

U.S. PATENT DOCUMENTS

| | | | |
|---|---|---|---|
| 2,507,243 | 5/1950 | Boyd et al. | 126/25 A |
| 2,556,365 | 6/1951 | McKnight, Jr. | 126/25 A |
| 2,577,963 | 12/1951 | Hogopian | 126/25 A |
| 3,016,816 | 1/1962 | Persinger et al. | 126/25 A |
| 3,018,771 | 1/1962 | Curtis | 126/25 A |
| 3,596,591 | 8/1971 | Spates | 126/41 R |
| 4,321,857 | 3/1982 | Best | 126/41 R |
| 4,462,306 | 7/1984 | Eisendrath | 37/4 |
| 4,541,406 | 9/1985 | DaSambiagio | 1/16 |
| 4,658,710 | 4/1987 | Quet et al. | 37/7 |
| 4,852,476 | 8/1989 | Sanchez . | |

*Primary Examiner*—Carl D. Price
*Attorney, Agent, or Firm*—Walker, McKenzie & Walker P.C.

[57] ABSTRACT

A grill for using combustible material to cook food items. The grill includes a body member defining a compartment and having a primary opening; a hood member for selectively covering the primary opening of the body member; a grate member mounting within the compartment of the body member for supporting the food items; a fire box for holding the combustible material; an ash pan for holding ashes produced when the combustible material held by the fire box is burned; a framework for holding the fire box and for holding the ash pan a fixed distance below the fire box; and a lifting mechanism for selectively moving the framework toward and away from the grate member, and for moving the fire box and the ash pan toward and away from the grate member with the ash pan held a fixed distance below the fire box.

10 Claims, 6 Drawing Sheets

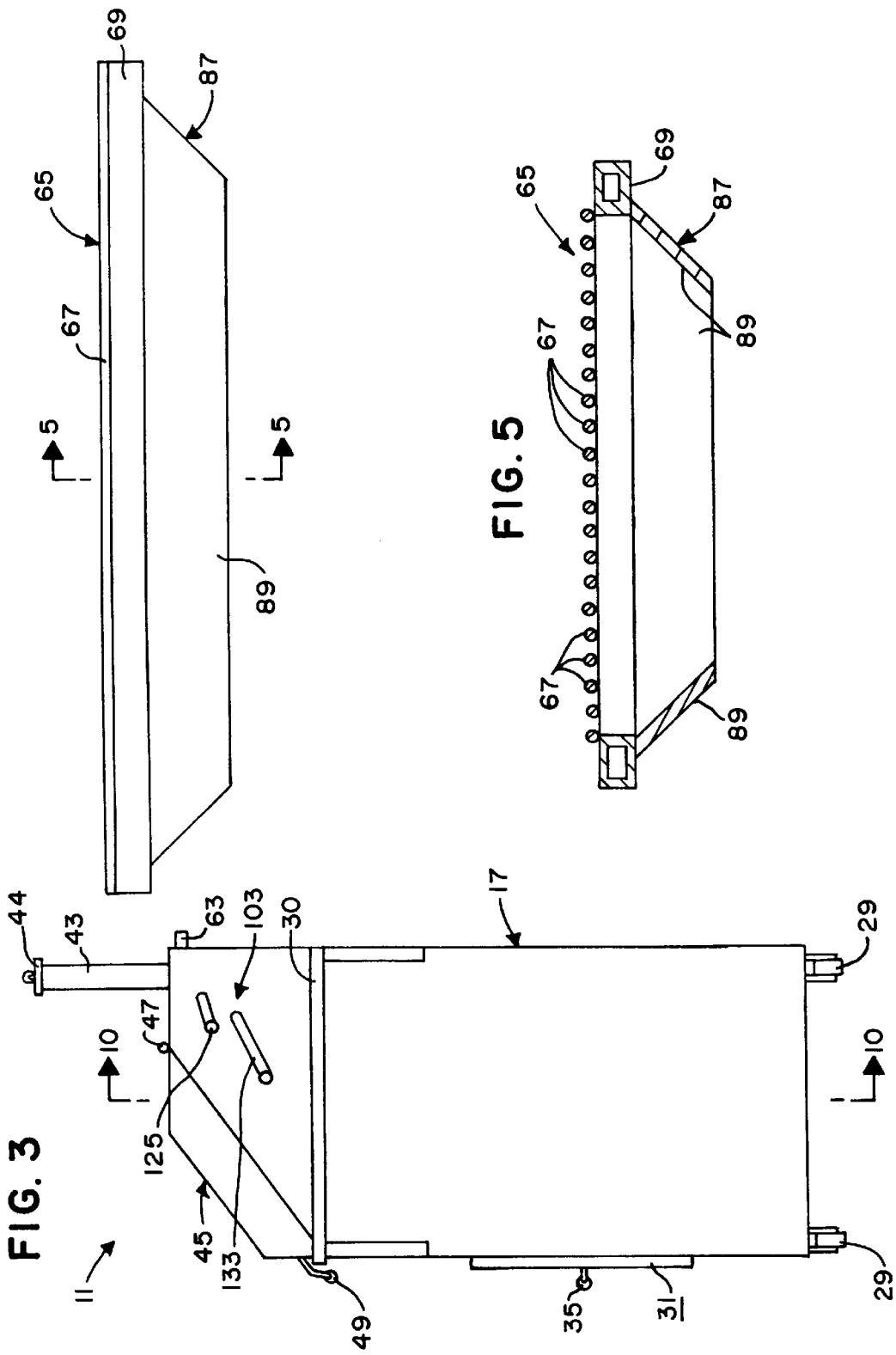

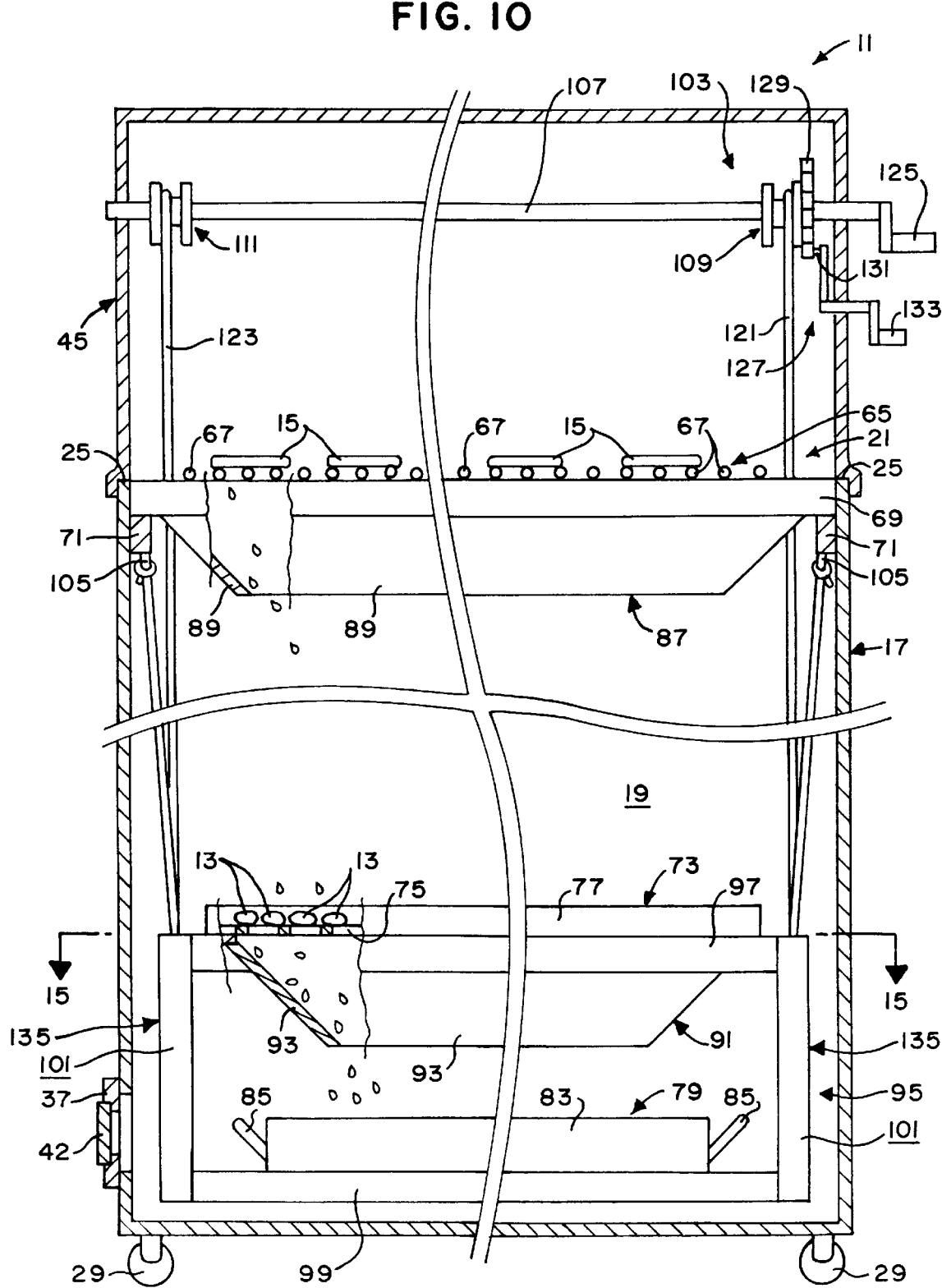

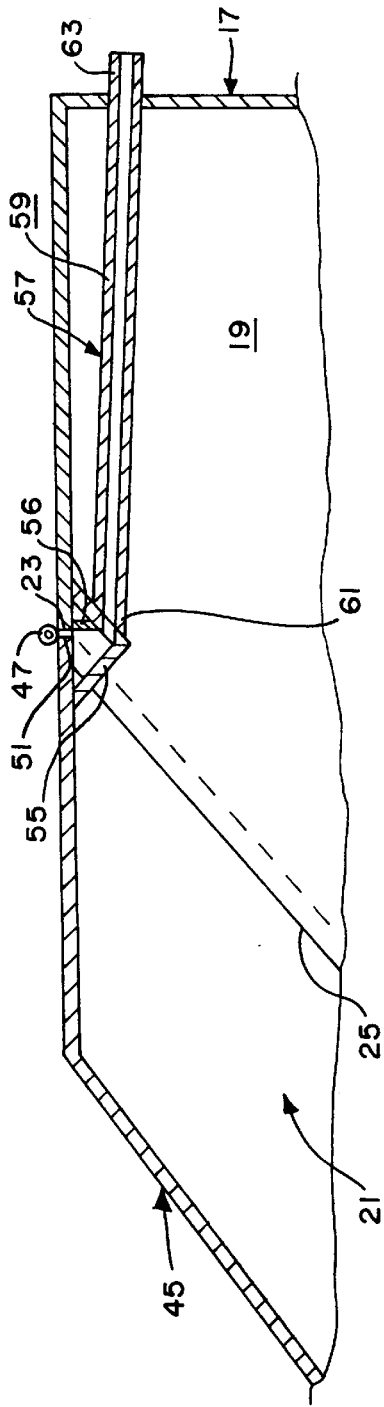
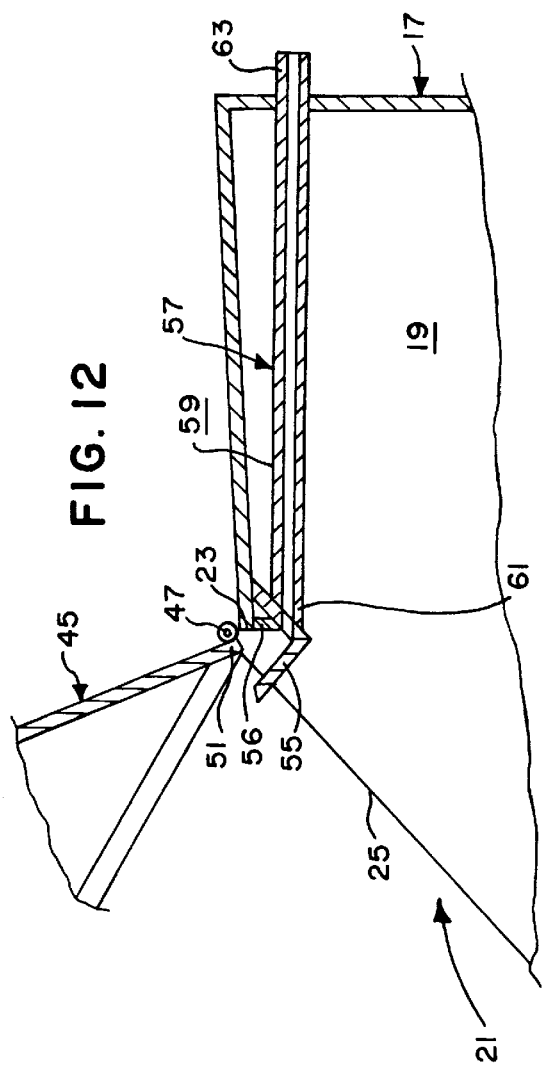

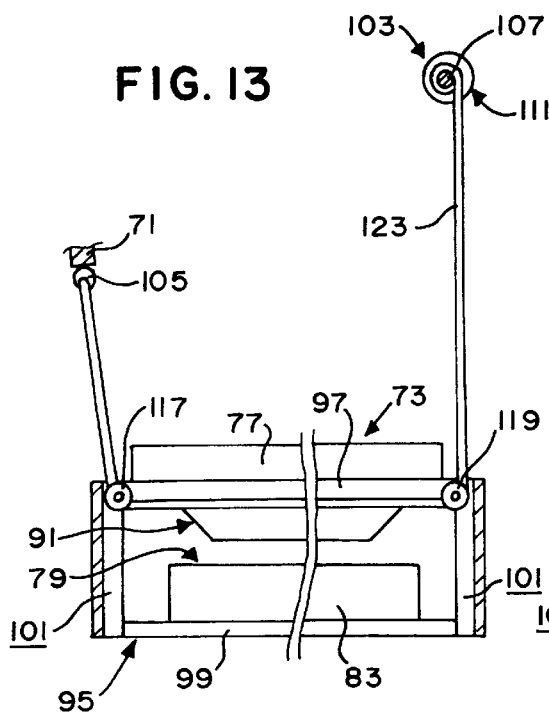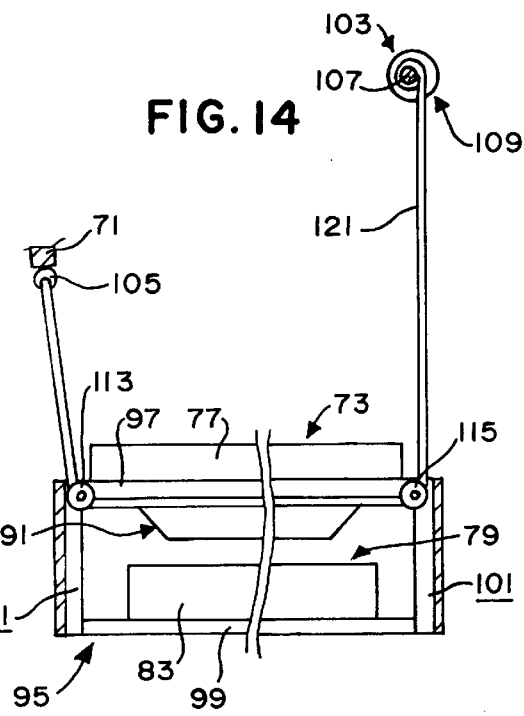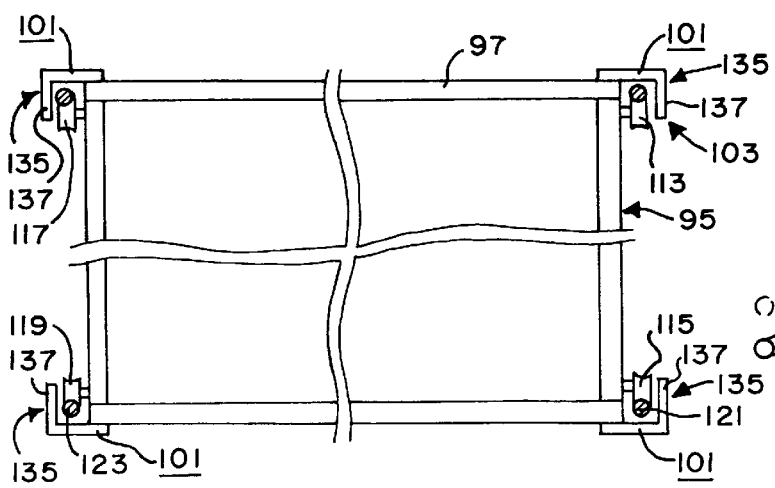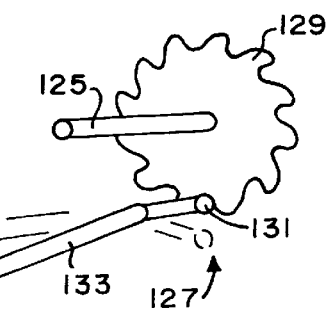

ADJUSTABLE COOKING GRILL

BACKGROUND OF THE INVENTION

1. Field of the Invention

The present invention relates, in general, to an improved grill having a fire box and an ash pan that are held a fixed distance apart from one another and that can be moved as a unit toward and away from a grate member for supporting items to be cooked.

2. Information Disclosure Statement

A preliminary patentability search conducted in class 126, subclasses 25A and 25AA, and in class 99, subclass 421HV, produced the following patents which appear to be relevant to the present invention:

Eisendrath, U.S. Pat. No. 4,462,306, issued Jul. 31, 1984, discloses an adjustable cooking grill having a bottom fire grate on which a fire may be built, and a food grill for supporting food to be cooked and capable of being raised and lowered relative to the fire grate.

DaSambiagio, U.S. Pat. No. 4,541,406, issued Sep. 17, 1985, discloses a portable grill comprising a base frame constructed from angle iron or the like, a removable coal tray resting inside the base, a grill rack having a plurality of V-shaped laterally running top bars pitched at an angle to allow grease to drain into a grease catcher located at the lower end of the grill rack, and means for raising and lowering the grill rack.

Quet et al., U.S. Pat. No. 4,658,710, issued Apr. 21, 1987, discloses a portable barbecue having an enclosed, hooded grill with an exhaust chimney. The grill includes a plurality of V-shaped channels for catching and transporting fats and juices from the cooking meat. A collector pan is carried along one end of the grill to receive the juices from the channels. Coals are disposed directly under the grill and a drive is employed to raise and lower the grill with respect to the coal bed.

Sanchez, U.S. Pat. No. 4,852,476, issued Aug. 1, 1989, discloses a barbecue grill including housing member, a food supporting assembly such as a grill or the like mounted within the housing member, and a heat source assembly suspended from a pair of steel wire elements that are wound on a bar and directed through pulleys in order to allow the heat source assembly to be uniformly raised and lowered with respect to the food supporting assembly.

Nothing in the known prior art discloses or suggests the present invention. More specifically, nothing in the known prior art discloses or suggests a grill including a body member defining a compartment and having a primary opening; a hood member for selectively covering the primary opening of the body member; a grate member mounting within the compartment of the body member for supporting the food items; a fire box for holding the combustible material; an ash pan for holding ashes produced when the combustible material held by the fire box is burned; a framework for holding the fire box and for holding the ash pan a fixed distance below the fire box; and lifting means for selectively moving the framework toward and away from the grate member, and for moving the fire box and the ash pan toward and away from the grate member with the ash pan held a fixed distance below the fire box.

BRIEF SUMMARY OF THE INVENTION

The present invention provides an improved grill. A basic concept of the present invention is to hold the fire box and ash pan of the grill a fixed distance apart from one another and provide means for moving the fire box and ash pan as a unit toward and away from the grate member of the grill.

The grill of the present invention comprises, in general, a housing or body member defining a compartment and having a primary opening; a hood member for selectively covering the primary opening of the body member; a grate member mounted within the compartment of the body member for supporting food items; a fire box mounted within the compartment of the body member for holding the combustible material; an ash pan mounted within the compartment of the body member for holding ashes produced when the combustible material held by the fire box is burned; a framework for holding the fire box and ash pan a fixed distance from one another; and lifting means for selectively moving the fire box and the ash pan toward and away from the grate member.

One object of the present invention is to provide an improved grill which allows the fire box and ash pan thereof to be held a fixed distance apart from one another and to be moved as a unit toward and away form the grate member of the grill.

Another object of the present invention is to provide the grate member with funnel means for funneling any material that passes through the grate member to the fire box.

Another object of the present invention is to provide the fire box with funnel means for funneling any material that passes through the fire box to the ash pan.

BRIEF DESCRIPTION OF THE SEVERAL VIEWS OF THE DRAWINGS

FIG. 3 is a right side elevational view of the grill of the present invention.

FIG. 4 is a front elevational view of a grate member of grill of the present invention.

FIG. 5 is a sectional view substantially as taken on line 5—5 of FIG. 4.

FIG. 10 is a sectional view substantially as taken on line 10—10 of FIG. 3 on an enlarged scale and with portions broken away and omitted for clarity.

FIG. 11 is a sectional view substantially as taken on line 11—11 of FIG. 2 on an enlarged scale and with portions broken away and omitted for clarity.

FIG. 12 is a sectional view similar to FIG. 11 but showing a hood member of the grill of the present invention in an opened position.

FIG. 13 is a somewhat diagrammatic sectional view showing one side of a lifting means of the grill of the present invention, combined with portions of the fire box and ash pan thereof, supported by a framework thereof.

FIG. 14 is a somewhat diagrammatic sectional view similar to FIG. 13 but showing the other side of the lifting means, etc.

FIG. 15 is a sectional view of portions of the lifting means and framework of the grill of the present invention substantially as taken on line 15—15 of FIG. 10 but with portions thereof omitted for clarity.

FIG. 16 is a somewhat diagrammatic sectional view of a lock means of the grill of the present invention.

DETAILED DESCRIPTION OF THE INVENTION

Figure 1:
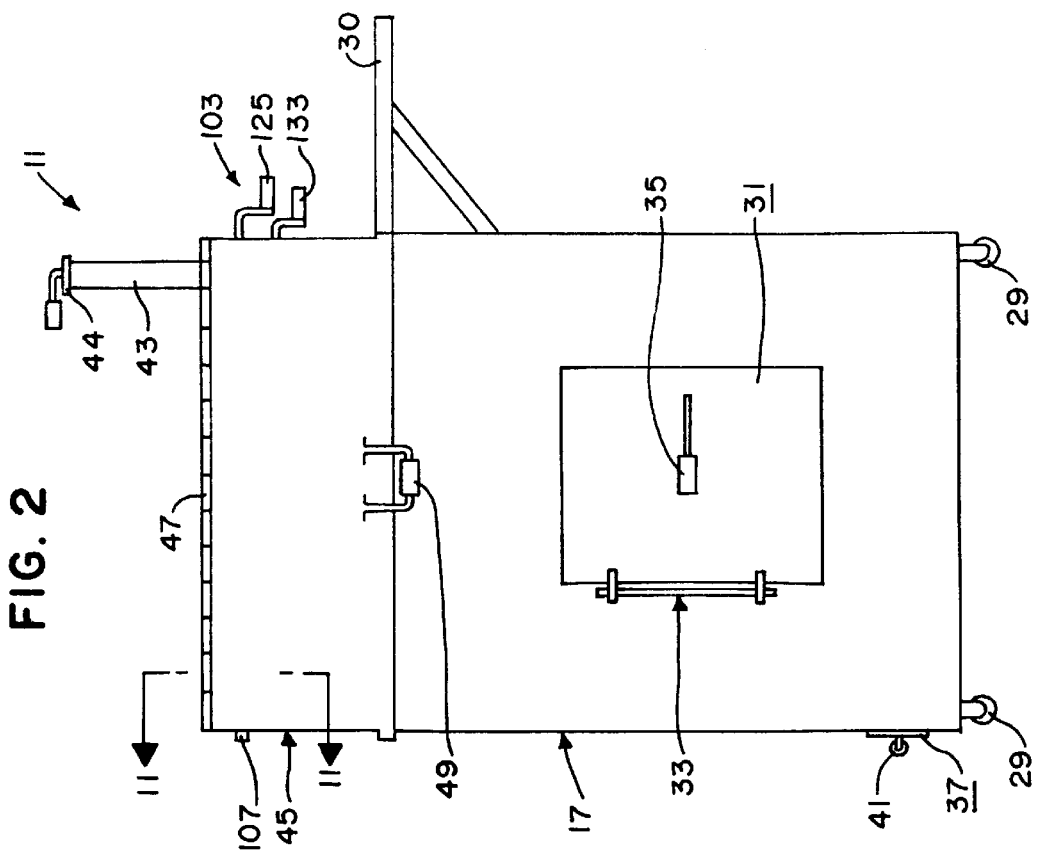
FIG. 1 is a left side elevational view of the grill of the present invention.
Figure 2:
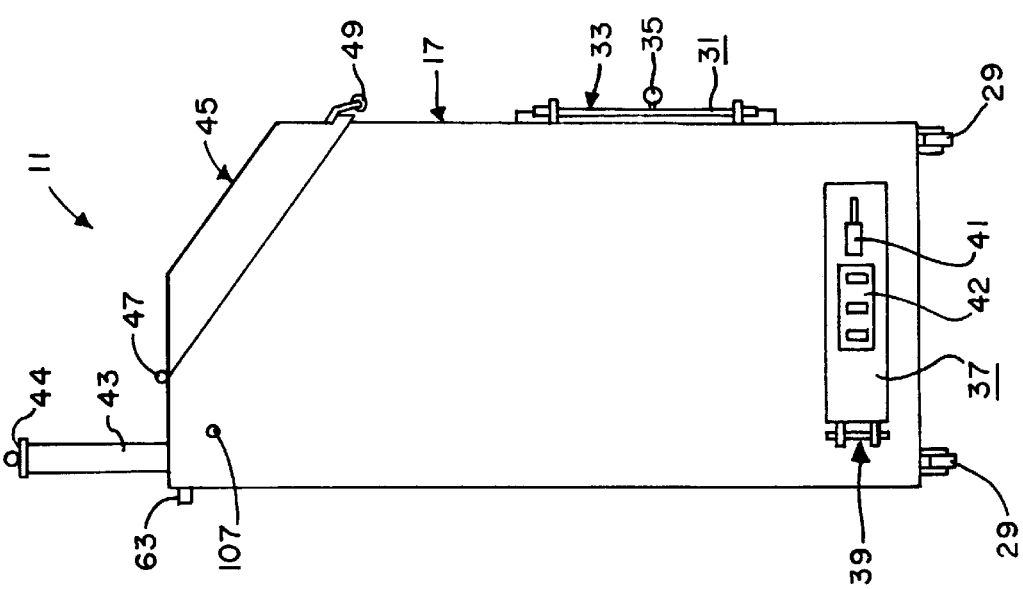
FIG. 2 is a front elevational view of the grill of the present invention.
Figure 6:
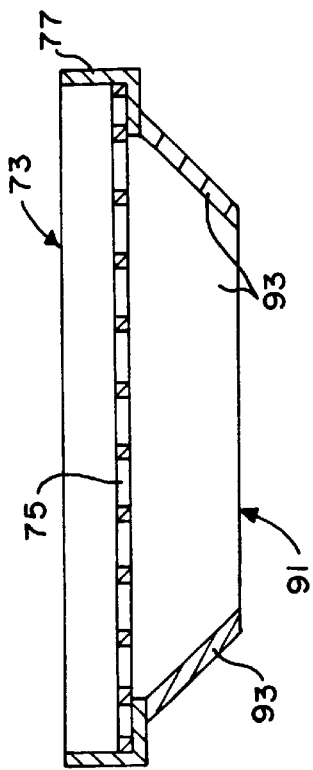
FIG. 6 is a front elevational view of a fire box of the grill of the present invention.
Figure 7:
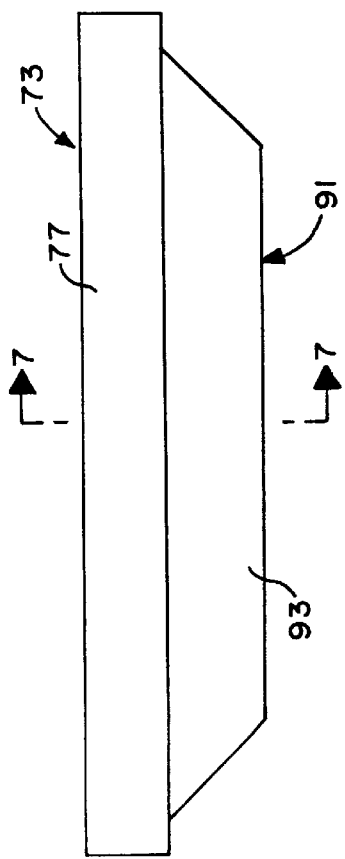
FIG. 7 is a sectional view substantially as taken on line 7—7 of FIG. 6.
Figure 8:
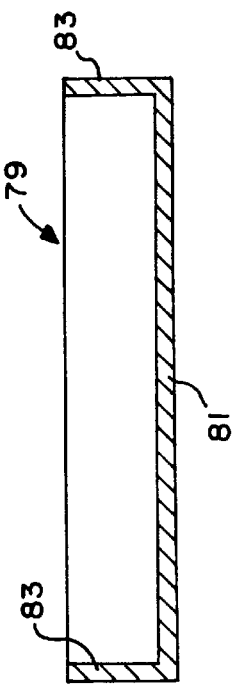
FIG. 8 is a front elevational view of an ash pan of the grill of the present invention.
Figure 9:
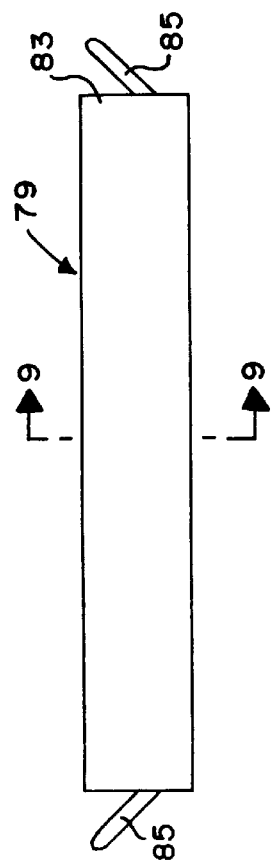
FIG. 9 is a sectional view substantially as taken on line 9—9 of FIG. 8.

The preferred embodiment of the improved adjustable cooking grill of the present invention is shown in FIGS. 1–16, and identified by the numeral 11. The grill 11 is designed for use with combustible material 13 such as charcoal and the like to cook, or grill, food items 15 (see, in general, FIG. 10).

The grill 11 includes a housing or body member 17 defining a compartment 19 and having a top or primary opening 21 through which the food items 15 can be inserted and extracted, etc. (see, in general, FIGS. 10–12). The primary opening 21 is preferably formed on an angle across the upper end of the front and the front end of the top of the body member 17, and has a back edge 23, side edges 25, and a front edge. Casters 29 or the like are preferably provided adjacent the bottom corners of the body member 17 so that the grill 11 can be rolled. Two casters 29 on one end of the body member 17 may be fixed while the two casters 29 on the other end of the body member 17 preferably swivel so that the grill 11 can be easily maneuvered and moved. A table 30 is preferably mounted on one end of the body member 17 to provide a preparation surface, etc. The table 30 can also act as a handle, etc., to allow the grill 11 to be easily pushed, etc. A front door 31 is preferably provided on the front of the body member 17. The front door 31 is preferably attached to the body member 17 by way of a pivot 33 so that the front door 31 can be easily moved between an open position in which access to the compartment 19 is provided and a closed position. A handle member 35 is preferably attached to the front door 31 to allow the front door 31 to be easily moved between the opened and closed positions. A side door 37 is preferably provided on one side of the body member 17. The side door 37 is preferably attached to the body member 17 by way of a pivot 39 so that the side door 37 can be easily moved between an open position in which access to the compartment 19 is provided and a closed position. A handle member 41 is preferably attached to the side door 37 to allow the side door 37 to be easily moved between the opened and closed positions. An adjustable vent 42 is preferably provided through the body member 17. Thus, as clearly shown in FIGS. 1 and 10, the adjustable vent 42 is preferably provided through the side door 37. A chimney 43, having an adjustable vent 44, is preferably provided in communication with the compartment 19.

The grill 11 includes a top door or hood member 45 for selectively covering the primary opening 21 of the body member 17. The hood member 45 is preferably attached to the body member 17 by way of a pivot 47 so that the hood member 45 can be easily moved between a closed position in which the primary opening 21 of the body member 17 is covered, and an opened position in which food items 15 can be easily inserted and extracted, etc., through the primary opening 21. A handle member 49 is preferably attached to the front of the hood member 45 to allow the hood member 45 to be easily moved between the opened and closed positions.

The pivot 47 preferably provides means for pivotally attaching the back edge 51 of the hood member 45 to the back edge 23 of the primary opening 21 of the body member 17, and may be constructed similar to a typical, heavy duty piano-type hinge or the like.

The grill 11 preferably includes a trough member 55 positioned between the back edge 51 of the hood member 45 and the back edge 23 of the primary opening 21 of the body member 17 (see, in general, FIGS. 11 and 12) for catching any material (e.g., rain water) that might pass into the compartment 21 of the body member 17 between the back edge 51 of the hood member 45 and the back edge 23 of the primary opening 21 of the body member 17. The trough member 55 preferably consists of an elongated metal angle structure or member extending along the entire length of the primary opening 21 of the body member 21 with the side edge of one leg welded or otherwise fixedly attached to the body member 17 within the compartment 19 adjacent the back edge 23 of the primary opening 21 of the body member 17 and the side edge of the other leg positioned so as to contact or almost contact the hood member 45 adjacent the back edge 51 thereof when the hood member 45 is closed as clearly shown in FIG. 11, so that any material such as rain water or the like that might pass into the compartment 19 around the pivot 45, through the joint between the back edge 51 of the hood member 45 and the back edge 23 of the primary opening 21 of the body member 17, etc., will be caught by the trough member 55 as will now be apparent to those skilled in the art. A reinforcement member 56 may be welded or otherwise fixedly attached between the trough member 55 and the body member 17 as clearly shown in FIGS. 11 and 12.

The grill 11 preferably includes passageway means 57 (see, in general, FIGS. 11 and 12) for allowing any material caught by the trough member 55 to pass from the compartment 19 of the body member 17. The passageway means 57 may include one or more (preferably two) pipes 59 extending from the trough member 55 to a point outside the compartment 19 of the body member 17. More specifically, each pipe 59 preferably has a first end 61 attached to the trough member 55 and a second end 63 that extends through the back side of the body member 17 as clearly shown in FIGS. 11 and 12 with the passageway through the interior of each pipe 59 angled slightly downward from first end 61 thereof at the lowest point of the trough member 55 to the second end 63 outside the compartment 19 of the body member 17 so that any material such as rain water that might be caught by the trough member 55 will flow by gravity through the pipes 59 out of the compartment 19 of the body member 17 as will now be apparent to those skilled in the art.

The grill 11 includes a grate member 65 (see, in general, FIGS. 4 and 5) mounted within the compartment 19 of the body member 17 for supporting the food items 15. The grate member 65 preferably includes a plurality of spaced apart bar members 67 mounted on an opened, rectangular metal frame 69 or the like. The body member 17 preferably includes mounts 71 fixed within the compartment 19 at a desired location for supporting the grate member 65 as shown in FIG. 10.

The grill 11 includes a fire box 73 (see, in general, FIGS. 6 and 7) for holding the combustible material 13. The fire box 73 preferably includes a relatively flat rack 75 made of expanded metal with diamond shaped apertures therethrough, and mounted on an opened, rectangular metal frame 77 or the like.

The grill 11 includes an ash pan 79 (see, in general, FIGS. 8 and 9) for holding ashes, etc., produced when the combustible material 13, etc., held by the fire box 73 is burned. The ash pan 79 preferably includes a generally rectangular, solid bottom member 81 surrounded by four side walls 83 to form an opened-top box for holding the ashes, etc. One or more handles 85 are preferably attached to the side walls 83 to allow the ash pan 79 to be easily moved, carried, etc.

The grill 11 preferably includes a grate funnel means 87 associated with the grate member 65 (see, in general, FIGS. 4 and 5) for funneling any material that passes through the grate member 65 to the fire box 73. The grate funnel means 87 may consist of one or more side plates 89 attached to the frame 69 of the grate member 65 and extending generally inwardly and downwardly as clearly shown in FIG. 10 to direct any material that passes through the grate member 65 in a funnel-like manner generally inwardly and downwardly into the fire box 73 as will now be apparent to those skilled in the art. The side plates 89 are preferably welded or otherwise fixedly attached to the frame 69 of the grate member 65 to form a unitary construct, etc.

The grill 11 preferably includes a fire box funnel means 91 associated with the fire box 73 (see, in general, FIGS. 6 and 7) for funneling any material that passes through the fire box 73 to the ash pan 79. The fire funnel means 91 may consist of one or more side plates 93 attached to the frame 77 of the fire box 73 and extending generally inwardly and downwardly as clearly shown in FIG. 10 to direct any material that passes through the fire box 73 in a funnel-like manner generally inwardly and downwardly into the ash pan 79 as will now be apparent to those skilled in the art. The side plates 93 are preferably welded or otherwise fixedly attached to the frame 77 of the fir box 73 to form a unitary construct, etc.

The grill 11 includes a framework 95 (see, in general, FIGS. 10 and 13–15) for holding the fire box 73 and ash pan 79 fixed relative to one another with the ash pan 79 held a fixed distance below the fire box 73. The framework 95 preferably consists of an opened skeleton-type box having a first or upper frame member 97 and a second or lower frame member 99 rigidly joined together by elongated legs 101 or the like so that the fire box 73 can be movably supported on the upper frame member 97 and the ash pan 79 can be movably supported on the lower frame member 99. The frame members 97, 99 and legs 101 are preferably constructed out of metal structural members welded or otherwise fixedly attached to one another to from a rigid, unitary construct.

The grill 11 includes lifting means 103 (see, in general, FIGS. 10 and 13–16) for selectively moving the framework 95 toward and away from the grate member 65, and for moving the fire box 73 and the ash pan 79 toward and away from the grate member 65 with the ash pan 79 held a fixed distance below the fire box 73. The body member 17 preferably includes one or more anchor points 105 within the compartment 19 thereof adjacent the primary opening 21. The lifting means 103 preferably includes a pivot rod 107 extending across the compartment 19 of the body member 17; a first pulley 109 attached to the pivot rod 107 adjacent one end of the compartment 19 of the body 17; a second pulley 111 attached to the pivot rod 107 adjacent the other end of the compartment 19 of the body 17; first and second sheaves 113, 115 attached relative to one end of the framework 95; third and fourth sheaves 117, 119 attached relative to the other end of the framework 95; a first cable 121 extending from the first pulley 109, through the first and second sheaves 113, 115, to an anchor point 105; and a second cable 123 extending from the second pulley 111, through the third and fourth sheaves 117, 119, to another anchor point 105 whereby rotation of the pivot rod 107 will cause the first and second cables 121, 123 to be wound about or unwound from the first and second pulleys 109, 111, respectively, so that the framework 95, the fire box 73, and the ash pan 79 will be raised or lowered as a unit with respect to the grate member 65. It should be noted that the anchor points 105 may consist of eyebolts or the like attached to the body member 17 at appropriate positions such as, for example, to the mounts 71 adjacent the front edge of the primary opening 21, etc. The lifting means 103 preferably includes a handle 125 attached to the pivot rod 107 outside of the body member 17 for allowing the pivot rod 107 to be easily rotated.

The lifting means 103 preferably includes lock means 127 (see, in general, FIGS. 10 and 16) for selectively preventing the pivot rod 107 from rotating. The lock means 127 preferably includes a tooth gear 129 fixedly attached to the pivot rod 107, a lock finger 131 for selectively engaging the tooth gear 129 to prevent the tooth gear 129, and thus the pivot rod 107, from rotating, and an activating handle 133 for moving the lock finger 131 into and out of engagement with the tooth gear 129. Springs or the like, not shown, might be included to normally urge the lock finger 131 into locking engagement with the tooth gear 129 as will now be apparent to those skilled in the art.

The framework 95 preferably includes guard means 135 (see, in general, FIGS. 10 and 13–15) for protecting the sheaves 113, 115, 117, 119, etc., as the framework 95 is raised and lowered with respect to the grate member 65. The guard means 135 may consist merely of structural members for at least partially covering each sheave 113, 115, 117, 119 to act as bumpers to prevent the sheaves 113, 115, 117, 119 from hitting or being hit by, and being damaged by, the body member 17, etc., as the framework 95 is raised and lowered within the body member 17. For example, the legs 101 of the framework 95 may include standard "angle iron" type metal structural members and the guard means 135 may be formed by one leg 137 of each "angle iron" member that covers at least a portion of a sheave 113, 115, 117, 119 as clearly shown in FIG. 15.

The grill 11 can be constructed in various sizes and ornamental designs, out of various specific materials, and in various specific manners as will now be apparent to those skilled in the art. Thus, for example, the body member 17, hood member 45, grate member 65, fire box 73, ash pan 79, grate funnel means 87, fire box funnel means 91 and framework 95 are preferably constructed as out of sheet metal, metal structural members (e.g., "angle iron"), etc., cut and welded to form rigid constructs of the desired shape and size. The various pulleys, sheaves, and gears may be standard off-the-shelf items, etc. The cables 121, 123 are preferably off-the-shelf braided steel cables.

The grill 11 may be used and operated in much the same manner as a typical grill. Combustible material 13 can be added to the fire box 73 through the front door 31 and the ash pan 79 may be removed and inserted through the side door 37. The "draft" that controls the actual fire may be varied by the adjustable vents 42, 44. The food items 15 may be placed on the grate member 65 through the hood member 45. The distance between the food items 15 and combustible material 13 may be varied by raising and lowering the framework 95 by merely rotating the handle 125, which will cause the fire box 73 and ash pan 79 to be raised and lowered as a unit. For example, the handle 125 can be turned counter clock wise to raise the framework 95 until the desired or proper height is established, and then turned clockwise until the lock means 127 is engaged to lock the framework 95 in that position. To subsequently lower the framework 95 so that, for example, combustible material 13 can be added to the fire box 73 through the front door 31, the handle 125 is rotated counter clock wise about a quarter turn or so, and, at the same time, the handle 133 is rotated clockwise about a quarter turn, thereby moving the lock finger 131 from the tooth gear 129. While the handle 133 is held in that raised position, the handle 125 can then be turned clockwise until the framework 95 is lowered to the desired position, or until there is no resistance on the handle 125 which indicates that the framework 95 has been fully lowered. With the framework 95 in that fully lowered position, the door 31 can be opened and combustible material 13 can be placed on the rack 75 of the fire box 73. The temperature of the fire is controlled by the adjustable vents 42, 44 as will now be apparent to those skilled in the art. The trough member 55 acts to collect any rain, etc., that passes into the compartment 19 through the pivot 47, and also acts as a seal for the pivot 47 so that very little air is allowed to escape therethrough. The funnel means 87 will divert any grease, etc., from the food items 15 downward into the fire box 73. The funnel means 91 will divert any ashes, etc., from the combustible material 13, and any grease, etc., from the food items 15 downward into the ash pan 79. When it is desired to empty the ash pan 79 (e.g., after the grill 11 has been used and the fire is cold), the framework 95 is lowered to its fully lowered position as discussed above, and the side door 37 is opened. The ash pan 79 can then be merely slid out the side door 37 and any ashes held thereby can then be properly disposed of, etc.

Although the present invention has been described and illustrated with respect to a preferred embodiments and a preferred uses therefor, it is not to be so limited since modifications and changes can be made therein which are within the full intended scope of the invention.

I claim:

1. A grill to use combustible material to cook food items; said grill comprising:
    (a) a body member defining a compartment and having a primary opening and including an anchor point within said compartment thereof adjacent said primary opening;
    (b) a hood member to selectively cover said primary opening of said body member;
    (c) a grate member mounted within said compartment of said body member to support the food items;
    (d) a fire box to hold the combustible material;
    (e) an ash pan to hold ashes produced when the combustible material held by said fire box is burned;
    (f) a framework to hold said fire box and to hold said ash pan a fixed distance below said fire box; said framework including an upper frame member and a lower frame member; and
    (g) a lift to selectively move said framework toward and away from said grate member, and to move said fire box and said ash pan toward and away from said grate member with said ash pan held a fixed distance below said fire box; said lift including a pivot rod extending across said compartment of said body member; a first pulley attached to said pivot rod within said compartment of said body; a second pulley attached to said pivot rod within said compartment of said body; a first sheave attached to said upper frame member of said framework; a second sheave attached to said upper frame member of said framework a spaced distance from said first sheave; a third sheave attached to said lower frame member of said framework; a fourth sheave attached to said lower frame member of said framework a spaced distance from said third sheave; a first cable extending from said first pulley, through said first and second sheaves, to said anchor point; and a second cable extending from said first pulley, through said third and fourth sheaves, to said anchor point whereby rotation of said pivot rod will cause said first and second cables to be wound about or unwound from said first and second pulleys, respectively, so that said framework, said fire box, and said ash pan will be raised or lowered as a unit with respect to said grate member.

2. The grill of claim 1 in which is included a grate funnel associated with said grate member to funnel any material that passes through said grate member to said fire box.

3. The grill of claim 1 in which is included a fire box funnel associated with said fire box to funnel any material that passes through said fire box to said ash pan.

4. The grill of claim 1 in which said primary opening of said body member has a back edge; in which said hood member has a back edge; in which is included a pivot to pivotally attach said back edge of said hood member to said back edge of said body member; and in which is included a trough member positioned between said back edge of said body member and said back edge of said hood member to catch any material that might pass into said compartment of said body member between said back edge of said body member and said back edge of said hood member.

5. The grill of claim 4 in which is included a passageway to allow any material caught by said trough member to pass from said compartment of said body member.

6. The grill of claim 1 in which said lift includes a handle attached to said pivot rod to allow said pivot rod to be easily rotated; and in which said lift includes a lock to selectively prevent said pivot rod from being rotated.

7. The grill of claim 1 in which is included a guard attached to said framework in a position to protect said sheave as said framework is raised and lowered with respect to said grate member.

8. A grill to use combustible material to cook food items; said grill comprising:
    (a) a body member defining a compartment and having a primary opening and including an anchor point within said compartment thereof adjacent said primary opening; said primary opening of said body member having a back edge;
    (b) a hood member to selectively cover said primary opening of said body member; said hood member having a back edge;
    (c) a pivot to pivotally attach said back edge of said hood member to said back edge of said body member;
    (d) a trough member positioned between said back edge of said body member and said back edge of said hood member to catch any material that might pass into said compartment of said body member between said back edge of said body member and said back edge of said hood member;
    (e) a passageway to allow any material caught by said trough member to pass from said compartment of said body member;
    (f) a grate member mounted within said compartment of said body member to support the food items;
    (g) a fire box to hold the combustible material;
    (h) a grate funnel associated with said grate member to funnel any material that passes through said grate member to said fire box;

(i) an ash pan to hold ashes produced when combustible material held by said fire box is burned;

(j) a fire box funnel associated with said fire box to funnel any material that passes through said fire box to said ash pan;

(k) a framework to hold said fire box pan and to hold said ash pan a fixed distance below said fire box; said framework including an upper frame member and a lower frame member; and (l) a lift to selectively move said framework toward and away from said grate member, and to move said fire box and said ash pan toward and away from said grate member with said ash pan held a fixed distance below said fire box; said lift including a pivot rod extending across said compartment of said body member; a first pulley attached to said pivot rod within said compartment of said body; a second pulley attached to said pivot rod within said compartment of said body; a first sheave attached to said upper frame member of said framework; a second sheave attached to said upper frame member of said framework a spaced distance from said first sheave; a third sheave attached to said lower frame member of said framework; a fourth sheave attached to said lower frame member of said framework a spaced distance from said third sheave; a first cable extending from said first pulley, through said first and second sheaves, to said anchor point; and a second cable extending from said first pulley, through said third and fourth sheaves, to said anchor point whereby rotation of said pivot rod will cause said first and second cables to be wound about or unwound from said first and second pulleys, respectively, so that said framework, said fire box, and said ash pan will be raised or lowered as a unit with respect to said grate member.

9. The grill of claim 8 in which said lift includes a handle attached to said pivot rod to allow said pivot rod to be easily rotated; and in which said lift includes a lock to selectively prevent said pivot rod from being rotated.

10. The grill of claim 8 in which is included a guard attached to said framework in a position to protect said sheave as said framework is raised and lowered with respect to said grate member.

\* \* \* \* \*